Patented Dec. 6, 1949

2,490,717

UNITED STATES PATENT OFFICE 2,490,717

METAL MERCAPTIDES OF 2-AMINO-BENZENETHIOL

Norbert Steiger, Nutley, N. J., assignor to Hoffmann-La Roche Inc., Nutley, N. J., a corporation of New Jersey No Drawing. Application February 12, 1946, Serial No. 647,196

4 Claims. (Cl. 260—429)

This invention relates to new metal mercaptides of 2-amino-benzenethiol, which compounds are useful for a variety of purposes, such as bactericides and fungicides. More particularly this invention relates to bismuth, mercury, lead, divalent iron, gold, and copper mercaptides of 2-amino-benzenethiol.

The compounds of the present invention may be prepared from the known compound zinc mercaptide of 2-amino-benzenethiol. In general, the process of preparation involves the formation of a hydrochloride of 2-amino-benzenethiol, by means of hydrochloric acid. This hydrochloride, which is insoluble in hydrochloric acid at low temperature, i. e., 0–10° C., is separated from the solution by chilling to a suitably low temperature, e. g., 0–10° C. The hydrochloride is filtered off and washed free of zinc chloride with hydrochloric acid. Thereafter the hydrochloride, which is soluble in hydrochloric acid at a high temperature, i. e., 80–100° C., is reacted with a suitable metal salt such as a metal chloride or metal acetate, in hydrochloric acid at an increased temperature, e. g., 80–100° C. Excess hydrochloric acid is removed by means of crystalline sodium acetate.

The preparation of various metal mercaptides of my invention is illustrated by the following examples, in which parts of reactants, solvents, and the like are shown. Obvious modifications and variations will be apparent to the skilled chemist in this art.

EXAMPLE 1

*Bismuth mercaptide of 2-amino-benzenethiol*

17 g. zinc-2-amino-benzenethiol are stirred in a flask with 100 cc. concentrated hydrochloric acid in an atmosphere of nitrogen, at 20–25° for 30–60 minutes. Thereafter the reaction mixture is chilled to 10°. A hydrochloride is formed, which separates in crystalline form and which is sucked off through a glass filter plate and washed with concentrated hydrochloric acid. The washing may be accomplished by two portions of 15 cc. each of concentrated hydrochloric acid. The hydrochloride is then dissolved at 80–90°, in a nitrogen atmosphere, in 100 cc. concentrated hydrochloric acid. Thereafter, 11 g. bismuth chloride are added and the mixture is heated to 90° to effect solution. The clear solution is then added to 180 g. crystalline sodium acetate, diluted with 500 cc. water, stirred one hour, filtered, and washed with water on the funnel. The bismuth mercaptide of 2-amino-benzenethiol, which is formed, is of bright orange color. It is dried in vacuo at 70–75°.

EXAMPLE 2

*Mercuric derivative*

8.5 g. zinc mercaptide of 2-amino-benzenethiol are converted into the hydrochloride with concentrated hydrochloric acid, as described in Example 1. The wet hydrochloride is added to a solution of 16 g. mercuric acetate in 50 cc. concentrated hydrochloric acid, the addition being carried out at 90°. A white precipitate is formed. The mass is poured into 90 g. crystalline sodium acetate. The composition is diluted with 50 cc. water, stirred for one-half hour, and the yellowish mercuric mercaptide which is formed is then filtered off and dried in vacuo at 60–70°.

This mercaptide, in dried form, is a yellowish powder insoluble in water and in organic solvents. The compound has high fungicidal and bactericidal activity in the form of a powder. It may be mixed with talcum, or made into an ointment with lanoline, or it may be prepared as an aqueous lotion with or without a dispersing agent, for use as a fungicide or bactericide.

By using the equivalent amount of lead acetate, yellow lead mercaptide is obtained which is, when dried, a yellow powder insoluble in water and in organic solvents:

EXAMPLE 3

*Cadmium derivative*

17 g. zinc mercaptide of 2-amino-benzenethiol are converted into the hydrochloride form as described in Example 1. This hydrochloride is added to a hot solution, e. g., 80–100°, of 23 g. $CdCl_2 \cdot 2\frac{1}{2}H_2O$ in 100 cc. concentrated hydrochloric acid. A precipitate forms. The mass is poured into 220 g. crystalline sodium acetate, diluted afterwards with 1000 cc. water, heated to 80°, filtered, and washed with water on the funnel. The filter cake is dried in vacuo. It is a white powder in dried form, insoluble in water and in organic solvents, and possesses high fungicidal and bactericidal activity.

EXAMPLE 4

*Iron derivative*

17 g. zinc mercaptide of 2-amino-benzenethiol are converted into the hydrochloride, as described in Example 1. 9.5 g. $FeCl_2 \cdot 4H_2O$ are dissolved in 100 cc. concentrated hydrochloric acid at 95°, bubbling nitrogen gas therethrough during the whole procedure. To this is added, at about 80–100° C., the wet cake of the hydrochloride, whereupon a clear light yellow solution is obtained. This solution is poured into 200 g. crystalline sodium acetate. This mass is then diluted with 1000 cc. water. A cream-colored precipitate forms which is filtered off, washed with water, and dried in vacuo at 50°. The iron compound is a cream-color powder when dried, insoluble in water and in organic solvents.

EXAMPLE 5

*Gold derivative*

5.1 g. zinc mercaptide of 2-amino-benzenethiol are converted into the hydrochloride with 25 cc. concentrated hydrochloric acid, as described in Example 1. 3.1 g. gold chloride are dissolved in 30 cc. concentrated hydrochloric acid, and to this solution, at 80–90°, is added the hydrochloride previously prepared. A white precipitate is formed. It is poured into 70 g. crystalline sodium acetate, diluted with 500 cc. water, filtered, washed with water, and dried. The dry gold compound is slightly cream-color, an amorphous compound, insoluble in water and in organic solvents.

EXAMPLE 6

*Copper derivative*

17 g. zinc mercaptide of 2-amino-benzenethiol are stirred in a flask with 100 cc. concentrated hydrochloric acid. The suspension is chilled in ice water. The formed hydrochloride is then filtered off on a fritted funnel. The solid material is washed with 10 cc. cold concentrated hydrochloric acid. This hydrochloride is then suspended in 100 cc. alcohol and dissolved with 50 cc. concentrated ammonium hydroxide. 9.3 g. $CuCl_2 \cdot 2H_2O$ are dissolved in about 100 cc. alcohol and treated with a large excess of concentrated ammonium hydroxide, about 100 cc. This solution is filtered, and to the filtrate is added the ammoniacal alcoholic solution of the hydrochloride previously prepared. The resulting suspension is diluted to 1 liter with water. This composition is then chilled to about 20° C., whereby insoluble copper mercaptide is precipitated. The copper mercaptide is filtered off, washed with dilute ammonia, then with water, and finally dried.

I claim:

1. Metal mercaptides of 2-amino-benzenethiol, the metal being a member of the group consisting of mercury, cadmium and bismuth.
2. Mercuric mercaptide of 2-amino-benzenethiol.
3. Bismuth mercaptide of 2-amino-benzenethiol.
4. Cadmium mercaptide of 2-amino-benzenethiol.

NORBERT STEIGER.

REFERENCES CITED

The following references are of record in the file of this patent:

UNITED STATES PATENTS

| Number | Name | Date |
|---|---|---|
| 1,633,626 | Feldt | June 28, 1927 |
| 1,938,585 | Estabrooke | Dec. 12, 1933 |
| 2,111,151 | Mueller | Mar. 15, 1938 |
| 2,130,242 | Messer | Sept. 13, 1938 |
| 2,346,102 | De Simo et al. | Apr. 4, 1944 |
| 2,370,592 | Trenner et al. | Feb. 27, 1945 |
| 2,430,287 | Flenner | Nov. 4, 1946 |

FOREIGN PATENTS

| Number | Country | Date |
|---|---|---|
| 157,853 | Great Britain | Apr. 10, 1922 |
| 465,291 | Great Britain | May 5, 1937 |
| 657,183 | France | May 17, 1929 |
| 426,345 | Germany | Mar. 6, 1926 |
| 426,346 | Germany | Mar. 6, 1926 |
| 492,886 | Germany | Mar. 27, 1927 |
| 526,170 | Germany | June 3, 1931 |

OTHER REFERENCES

Lecher: "Ber. deutsch. Chem. Ges.," vol. 53 (1920) page 575.

Hess: Berichte, volume 14, pages 488–493.

Bauer et al.: Berichte, volume 66B (1933) pages 1041–6.

Chem. Abstracts, volume 26, pages 121 and 122, Ledochowski.